United States Patent
Clyne

(10) Patent No.: US 10,203,588 B2
(45) Date of Patent: Feb. 12, 2019

(54) DRAINAGE CHANNEL FOR A SUBMERSIBLE CAMERA WITH DRAINAGE PORTS ON TWO SURFACES

(71) Applicant: GoPro, Inc., San Mateo, CA (US)

(72) Inventor: Joshua Randall Clyne, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/705,241

(22) Filed: Sep. 14, 2017

(65) Prior Publication Data

US 2018/0081258 A1    Mar. 22, 2018

Related U.S. Application Data

(60) Provisional application No. 62/395,941, filed on Sep. 16, 2016.

(51) Int. Cl.
| | |
|---|---|
| *H04N 5/225* | (2006.01) |
| *G03B 17/08* | (2006.01) |
| *G03B 31/00* | (2006.01) |
| *G06F 3/16* | (2006.01) |

(52) U.S. Cl.
CPC ............ *G03B 17/08* (2013.01); *G03B 31/00* (2013.01); *G06F 3/16* (2013.01); *H04N 5/2252* (2013.01); *H04N 5/2253* (2013.01); *H04N 5/2254* (2013.01)

(58) Field of Classification Search
CPC ...... G03B 17/08; G03B 31/00; H04N 5/2253; H04N 5/2252; H04N 5/2254; G06F 3/16
See application file for complete search history.

(56) References Cited

U.S. PATENT DOCUMENTS

| | | | | |
|---|---|---|---|---|
| 2005/0220448 A1* | 10/2005 | Tei | .......................... | G03B 17/08 396/25 |
| 2008/0245452 A1* | 10/2008 | Law | ...................... | A45C 11/38 150/154 |
| 2010/0060747 A1* | 3/2010 | Woodman | .............. | G03B 17/02 348/222.1 |
| 2015/0296108 A1* | 10/2015 | Hayakawa | ............. | G03B 17/08 348/148 |
| 2017/0006195 A1* | 1/2017 | Tisch | ................... | H04N 5/2252 |
| 2018/0072240 A1* | 3/2018 | Suman | ................... | G03B 17/00 |
| 2018/0084339 A1* | 3/2018 | Asuncion | ................. | H04R 1/44 |
| 2018/0084340 A1* | 3/2018 | Clyne | ..................... | H04R 1/44 |

* cited by examiner

*Primary Examiner* — Shahbaz Nazrul

(74) *Attorney, Agent, or Firm* — Young Basile Hanlon & MacFarlane, P.C.

(57) ABSTRACT

A camera system with six faces and a front housing is configured to capture images and audio content from external the camera body. The camera system includes an interior audio assembly protected from external environments by a waterproof membrane. The camera system includes drainage ports on the bottom face and the left face of the camera system to encourage moisture to drain from the system. A first drainage channel couples the internal audio assembly to the first drainage port on left face of the camera system and a second drainage channel couples the drainage port on the left face of the camera system to the drainage port on the bottom face of the camera system. A third drainage channel exists between the front face of the camera system and the front housing, the third drainage channel coupling the first and second drainage channels.

20 Claims, 7 Drawing Sheets

DRAINAGE CHANNEL FOR A SUBMERSIBLE CAMERA WITH DRAINAGE PORTS ON TWO SURFACES

CROSS REFERENCE TO RELATED APPLICATIONS

This application claims the benefit of U.S. Provisional Application No. 62/395,941, filed Sep. 16, 2016, which is incorporated by reference in its entirety.

BACKGROUND

Field of Art

This description generally relates to an audio system of a submersible camera system, and more specifically to an audio system having a drainage channel for draining water away from microphones.

Description of the Related Art

Digital cameras are becoming faster, more powerful, and cheaper to produce. As the technology behind cameras has improved, a sub-set of miniaturized high quality "action cameras" used in non-traditional camera environments has been developed. During use in some of these environments, the camera may regularly be submerged and unsubmerged from water. However, audio performance may be impacted when the camera emerges from water.

DETAILED DESCRIPTION

Figure 1A:
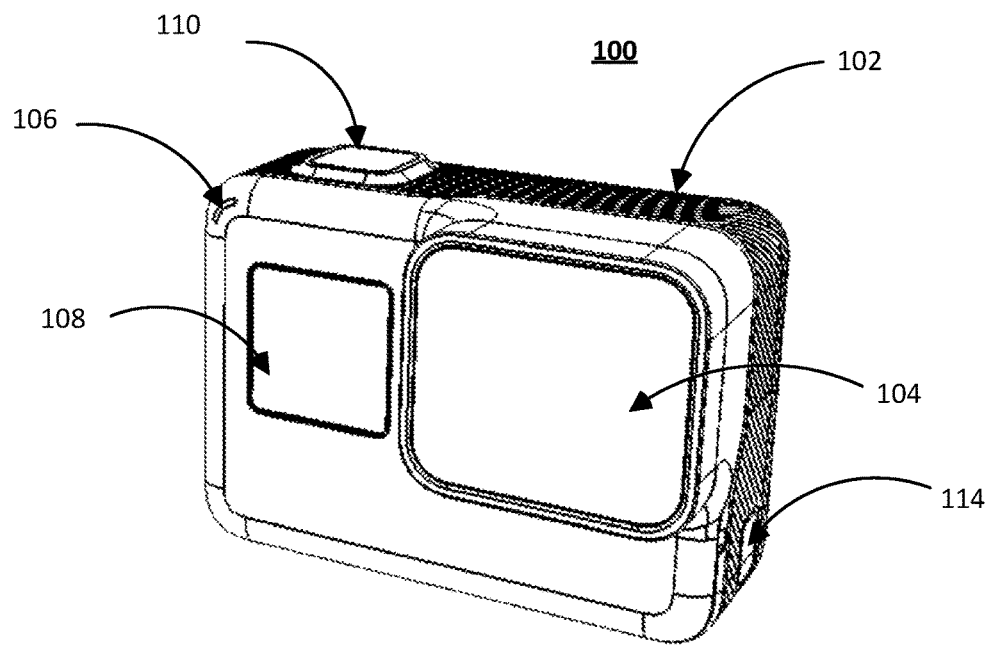
FIG. 1A is a first isometric view of a submersible camera system, according to one embodiment.
Figure 1B:
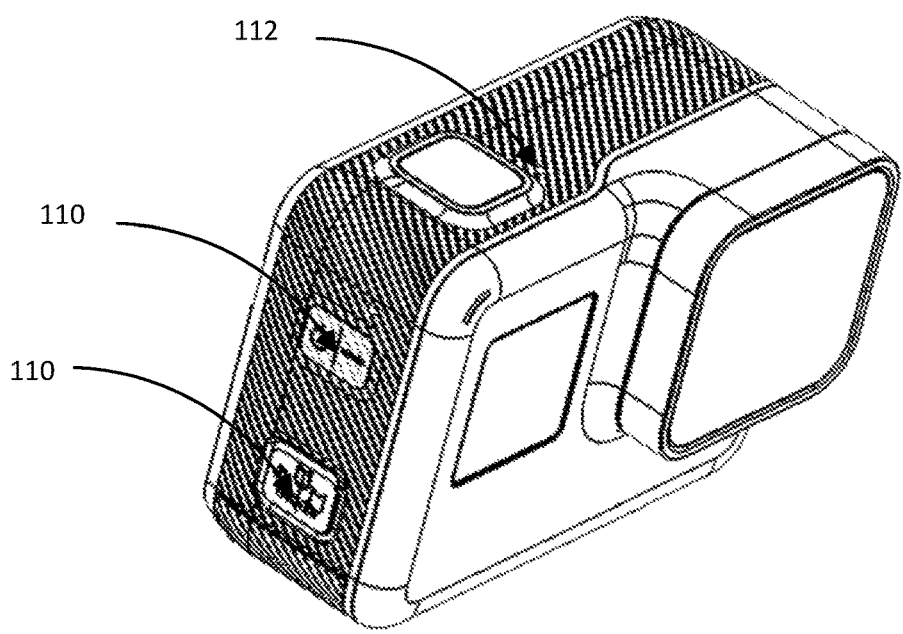
FIG. 1B is a second isometric view of a submersible camera system, according to one embodiment.
Figure 1C:
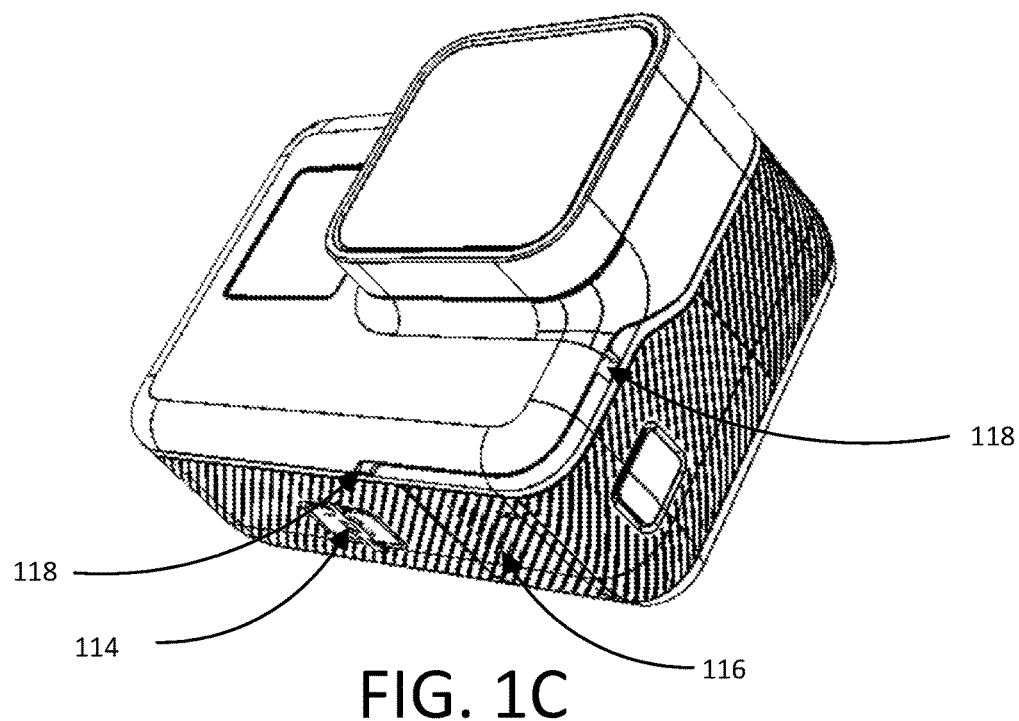
FIG. 1C is a third isometric view of a submersible camera system, according to one embodiment.
Figure 1D:
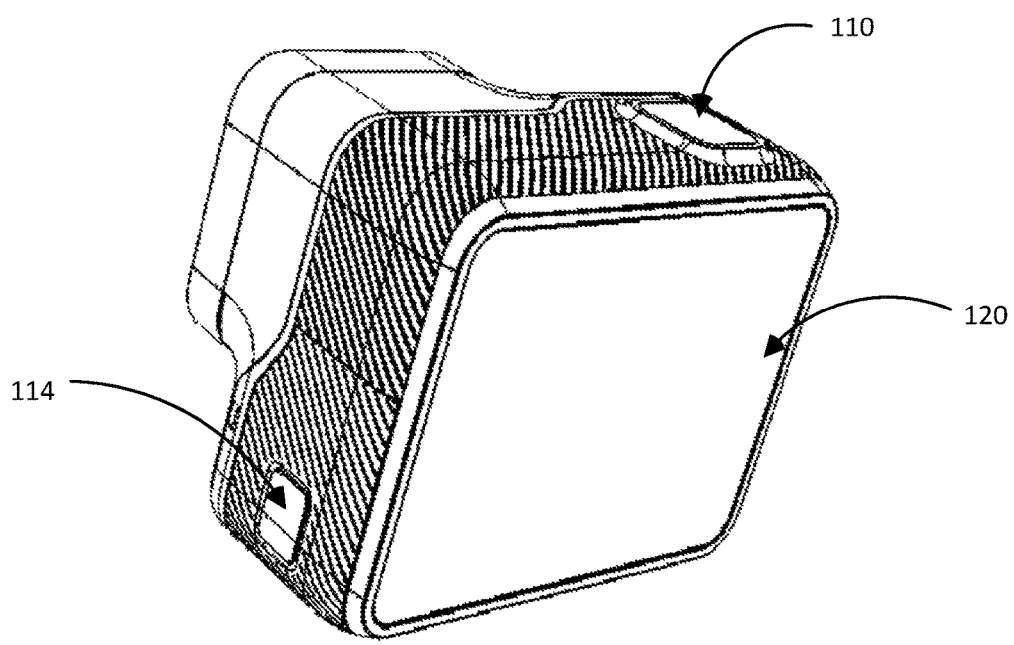
FIG. 1D is a fourth isometric view of a submersible camera system, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system configured to capture images from external the camera body via a lens assembly has a camera body. The camera body can include a bottom face, left face, right face, back face, top face, and front face. The front face of the camera body is covered by a front housing. The camera system includes an internal audio assembly recessed below the front face of the camera body. The internal audio system contains a microphone configured to capture audio signals from sources external to the camera body protected by a waterproof membrane that prevents water from passing from external the camera body to the microphone.

The camera system has a plurality of drainage ports and drainage channels to drain moisture from the camera system; specifically, to drain moisture away from the internal audio assembly and towards the external surfaces of the camera body.

In one embodiment, there are drainage ports on the left face and bottom face of the camera, each drainage port an opening to the drainage channels. There are three drainage channels within the camera system for assisting in draining moisture from the camera system: a first channel coupling the audio assembly to the drainage port on the left side of the channel, a second channel coupling the drainage port on the left face of the camera to the drainage port on the bottom face of the camera, and a third channel that exists between the front face and the front housing that couples the first and second channels.

In other embodiments, the drainage ports are on the left side and bottom side of the front surface of the camera; or, alternatively, the drainage ports can be on any two surfaces of the camera body. In all embodiments, the drainage channels are configured such that moisture drains from the internal audio assembly towards the drainage ports.

Additional embodiments are described in further detail below

Example Camera Configuration

FIGS. 1A-1D illustrate an embodiment of an example camera 100 that may include an audio systems for use in a submersible camera system. The camera 100 may comprise a camera body 102 having a camera lens 104 structured on a front surface of the camera body, various indicators on the front of the surface of the camera body 102 (such as LEDs, displays, and the like), various input mechanisms (such as buttons, switches, and touch-screen mechanisms), and electronics (e.g., imaging electronics, power electronics, etc.) internal to the camera body 102 for capturing images via the camera lens and/or performing other functions. The camera 100 may be configured to capture images and video, and to store captured images and video for subsequent display or playback.

The camera 100 can include various indicators, including the LED lights 106 and the LED display 108. The camera 100 can also include buttons 110 configured to allow a user of the camera to interact with the camera, to turn the camera on, and to otherwise configure the operating mode of the camera. The camera 100 can also include a microphone 112 configured to receive and record audio signals in conjunction with recording video integrated into the camera housing. The side of the camera 100 may include an I/O interface 114. The camera may also include a loudspeaker 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the camera 100 may include a lens 104 configured to receive light incident upon the lens and to direct received light onto an image sensor internal to the lens.

The camera 100 includes a camera exterior that encompasses and protects the camera's internal electronics, which are further described in later sections. The camera exterior includes 6 surfaces (i.e. a front face, a left face, a right face, a back face, a top face, and a bottom face), wherein the exterior surfaces form a rectangular cuboid. Furthermore, both the front and rear surfaces of the camera 100 are substantially rectangular in shape. The camera 100 can be made of a rigid material such as plastic, aluminum, steel, or fiberglass. Additional camera features, such as the features described above, may be affixed to an exterior of the camera. In some embodiments, the camera described herein includes features other than those described below. For example, instead of a single interface button, the camera can include additional buttons or different interface features, such as a multiple microphone openings to receive voice or other audio commands.

Integrated Drainage Channel

An integrated drainage channel for use in a submersible camera system may comprise a microphone system and a drainage channel to remove water from the microphone system when not submerged. For example, the microphone system may include a microphone internal to the camera body and separated from external environments by a waterproof membrane coupled to the camera body while still allowing translation of vibrational sound waves through the waterproof membrane. The drainage channel may be configured such that it is internal to the front protective cover of the camera system.

Figure 2A:
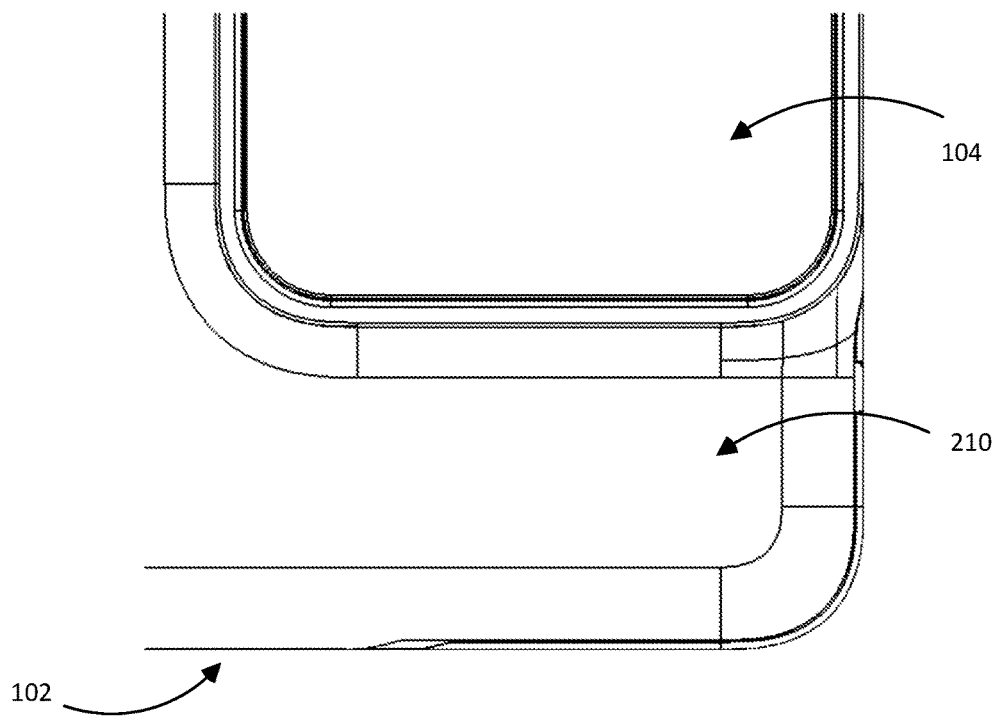
FIG. 2A is a first planar view of the front face of a submersible camera system with a drainage channel, according to one embodiment.
Figure 2B:
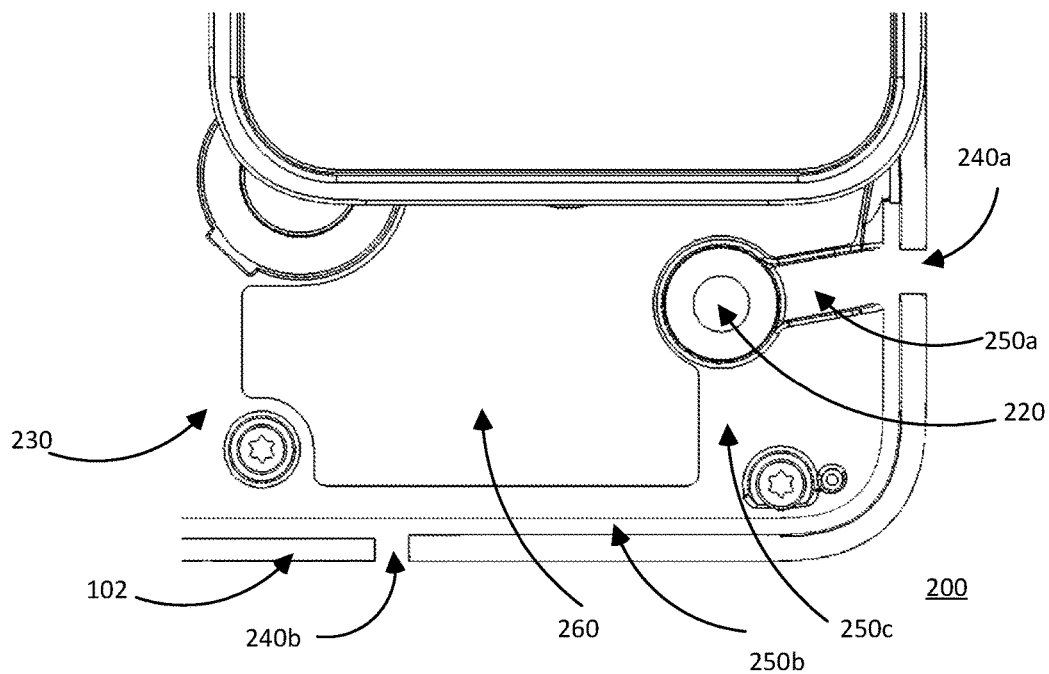
FIG. 2B is a second planar view of the front face of a submersible camera system with a drainage channel with the front cover removed, according to one embodiment.
Figure 2C:
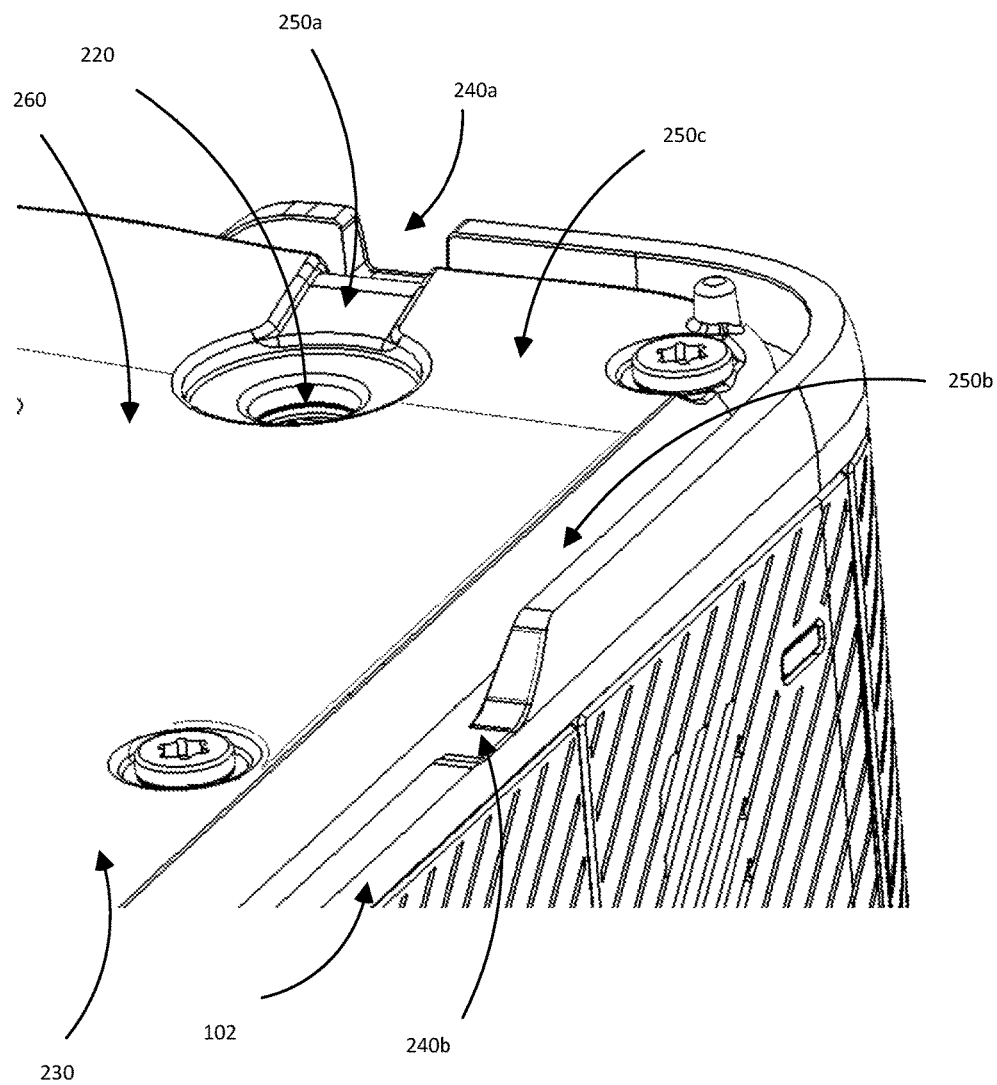
FIG. 2C is an isometric view of the front face of a submersible camera system with a drainage channel with the front cover removed, according to one embodiment.

FIGS. 2A-2C illustrate an embodiment of an integrated drainage channel that may be used in a submersible camera system 100. FIG. 2A illustrates a planar view of the front surface of the submersible camera with the front housing 210 coupled to the camera body 102. FIG. 2B illustrates a planar view of the submersible camera with the front housing decoupled and removed from the camera body 102, showing components of the integrated drainage channel internal to the camera housing. FIG. 2C illustrates an isometric view of the drainage channel with the front housing removed, showing components of the integrated drainage channels internal to the camera housing.

Front Housing

The camera system may comprise a front housing 210 covering the front facing (e.g. out of the plane of the page in the orientation of FIG. 2A) surface of the camera system. The front housing can have a front side and a back side (e.g. out of the plane and into the plane of the page, respectively, in the orientation of FIG. 2A). The back side of the front housing 210 couples to the front surface 230 of the camera body 102 such that their respective edges are substantially aligned. The front housing 210 is further coupled to the camera body 102 such that the interface between the back side of the front housing and the front surface of the camera body 102 is substantially flush. In some embodiments, the interface between the back side of the front housing 210 and the front surface 230 of the camera housing 102 may include areas in which the interface is not substantially flush (i.e. areas where the front housing 210 is slightly raised from the front surface 230 of the camera body 102, or areas where the front surface 230 of the camera body 102 is slightly recessed from the back side of the front housing 210). The front housing 210 may be made of similar rigid materials to the camera body 102 such as plastic, rubber, aluminum, steel, fiberglass, or a combination of materials. The front housing 210 may be coupled to the camera body 102 by an adhesive, a screw, a latch, or any other components or materials that may securely fasten one surface to another.

Internal Components

Internal to the front housing are components making up at least one drainage channel 250 configured to remove excess water from a microphone port 220 internal to the front surface 230 of the camera: a first drainage port 240a, a second drainage port 240b, a first drainage channel 250a, a second drainage channel 250b, a third drainage channel 250c, and a housing adhesive layer 260.

Microphone System

In the illustrated embodiment, the microphone system is recessed below the front surface of the camera body 230. The microphone port 220 of the microphone system is orthogonal to the front surface 230 and may couple the microphone system to the external environment via the drainage channels 250 and drainage ports 240. The microphone port 220 can be the portion of the waterproof membrane protecting the microphone exposed to the external environment and can be substantially circular in shape. In some embodiments, the microphone port 220 may be surrounded by a support structure configured to prevent structural compromise of the microphone port.

Drainage Ports

The drainage ports can be configured to allow for the draining of excess moisture from the camera system. Additionally, the drainage ports 240 may be structured to allow sound waves to enter the front housing 210 and propagate to the microphone system internal to the camera body via the microphone port 220. The first drainage port 240a may be located on the left surface of the camera body 102 (e.g. on the right side of the camera 100 when viewed in the orientation of FIG. 2B). The first drainage port 240a may comprise an indentation or opening in the camera body 102 such that when the camera body 102 is coupled to the front housing 210 the first drainage port 240a provides an opening from the external environment to the drainage channels 250 internal the front housing 210. The second drainage port 240b can be located on the bottom surface of the camera body (e.g. on the bottom side of the camera when viewed in the orientation of FIG. 2B). The second drainage port 240b may be an indentation or opening in the camera body 102 such that when camera body 102 is coupled to the front housing 210 the second drainage port 240b provides an opening from the external environment to the drainage channels 250 internal the camera housing. Conversely, the drainage ports 240 can be an indentation or opening in the camera housing 210 that couple to the drainage channels 250 when the camera housing is coupled to the front surface of the camera body. In some embodiments, the first drainage port 240a may be on the left side of the front surface 230 of the camera body 102 (e.g. on the right side of the front surface when viewed in the orientation of FIG. 2B) and the second drainage port 240b may be on the bottom side of the front surface 230 of the camera body 102 (e.g. on the bottom side of the front surface 230 when viewed in the orientation of FIG. 2B).

In some embodiments, the drainage ports 240 can be formed at the interface between the camera body 102 and the front housing 210. There may be at least one gap in the interface between the front housing 210 and the camera body 102 that forms an opening that can act as the drainage ports 240. In other embodiments, the drainage ports 240 may include more than one indentation, opening, or interface gap on each face to allow for increased drainage from the internal drainage channels 250.

Drainage Channels

The drainage channels 250 internal to the camera housing may be structured to allow sound waves to propagate towards the microphone port 220 internal to the camera body and allow for moisture internal to camera system 100 to drain from the camera via the drainage ports 240.

The first drainage channel 250a can be a recession in the front surface 230 of the camera body 102 and may include a channel coupling a recessed area around the microphone port 220 to the first drainage port 240a. The first drainage channel can have a top side and a bottom side (e.g. upwards and downwards, respectively, viewed in the orientation of FIG. 2B). In the illustrated example embodiment, the first drainage channel 250a includes a first portion having an area similarly shaped to a circle coupled to a second portion having a substantially rectangular area. The circle may have the microphone port 220 at its center and may be more deeply recessed below the surface of the camera than the rectangular area. The rectangular area may be coupled to the circular area such that the rectangular area couples the first drainage port 240a to the circular area.

The second drainage channel 250b can include a recession in the front surface 230 of the camera body 102 and may couple the first drainage port 240a to the second drainage port 240b. The second drainage channel can have a top side and a right side (e.g. upwards and to the left, respectively, when viewed in the orientation of FIG. 2B). In the illustrated embodiment, the second drainage channel 250b can include a recessed surface adjacent and proximal to the perimeter of the camera body 102 between the first drainage port 240a and second drainage port 240b. The second drainage channel can follow the perimeter of the camera 100 from the right side of the front surface to the bottom side of the front surface, when viewed in the orientation of FIG. 2B. In other embodiments, the second drainage channel can follows the edges of the camera and connects the right surface of the camera to the bottom surface of the camera.

The third drainage channel 250c may be a space formed between the front surface 230 of the camera and the back side of the front housing 210. In the illustrated embodiment, the third drainage channel 250c can be a cavity formed between the front surface 230 of the camera body 102 and the back side of the front housing 210. The perimeter of the cavity can be the interface between the right side of the front surface 230 of the camera body 102 and the front housing 210, the interface between the bottom side of the front surface 230 of the camera body 102 and the front housing 210, the interface between the left side of the front housing 210 adhesive 260 (e.g. right side of the adhesive in the orientation of FIG. 2B) and the front housing, and the interface between the top side of the first drainage channel 250a and the front housing. The area of the third drainage channel 250c can be proximal to the interface between the bottom and left surfaces of the camera body 102 and the front housing 210 between the first drainage port 240a and the second drainage port 240b (e.g. a bottom right area in the orientation of FIG. 2B). The third drainage channel 250c may be formed by at least some of the area of the front surface of the camera 230 that is not covered by the housing adhesive layer 260.

The third drainage channel 250c may assist in draining moisture from the first drainage port 240a to the second drainage port 240b using capillary forces of the moisture between the back side of the front housing 210 and front surface 230 of the camera body 102. In some embodiments, the third drainage channel 250c includes a hydrophobic coating on the front surface 230 of the camera body in which the adhesive layer 260 is not present. In still other embodiments, the third drainage channel 250c includes a hydrophobic coating on the inner surface of the front housing 210. The hydrophobic coatings can improve drainage of the system by preventing moisture from adhering to the drainage channels 250.

Figure 3A:
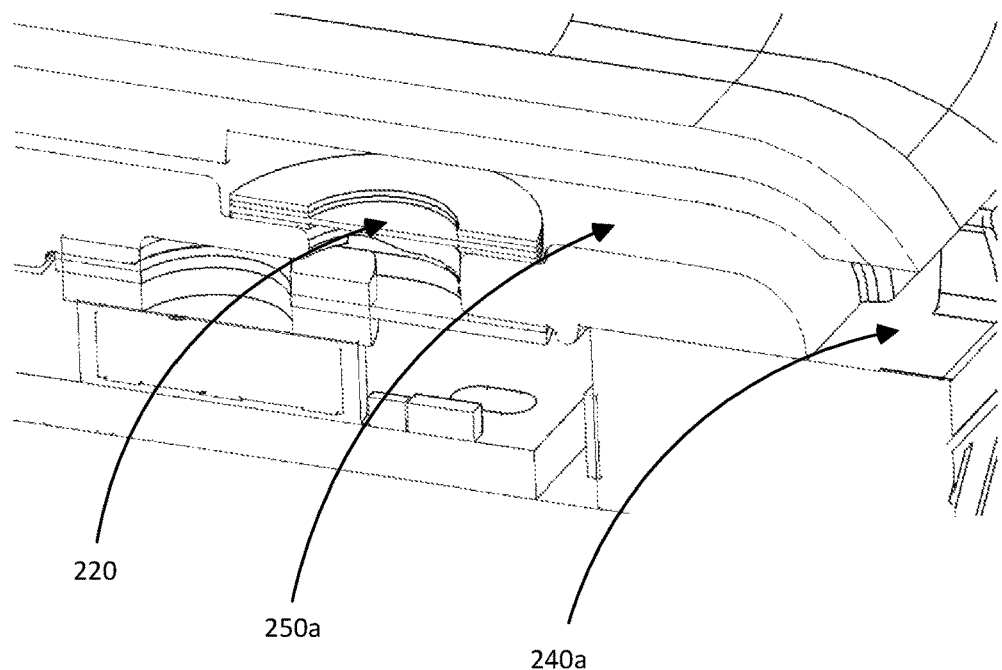
FIG. 3A is a first isometric cross-sectional view of the drainage channel connecting a speaker to the camera body of a submersible camera system, according to one embodiment.
Figure 3B:
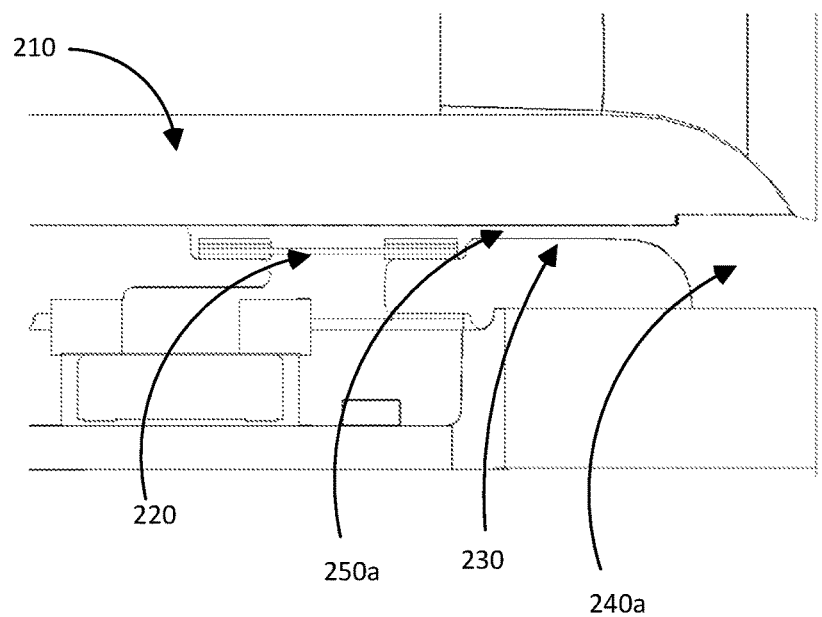
FIG. 3B is a second isometric cross-sectional view of the drainage channel of a submersible camera system, according to one embodiment.
Figure 3C:
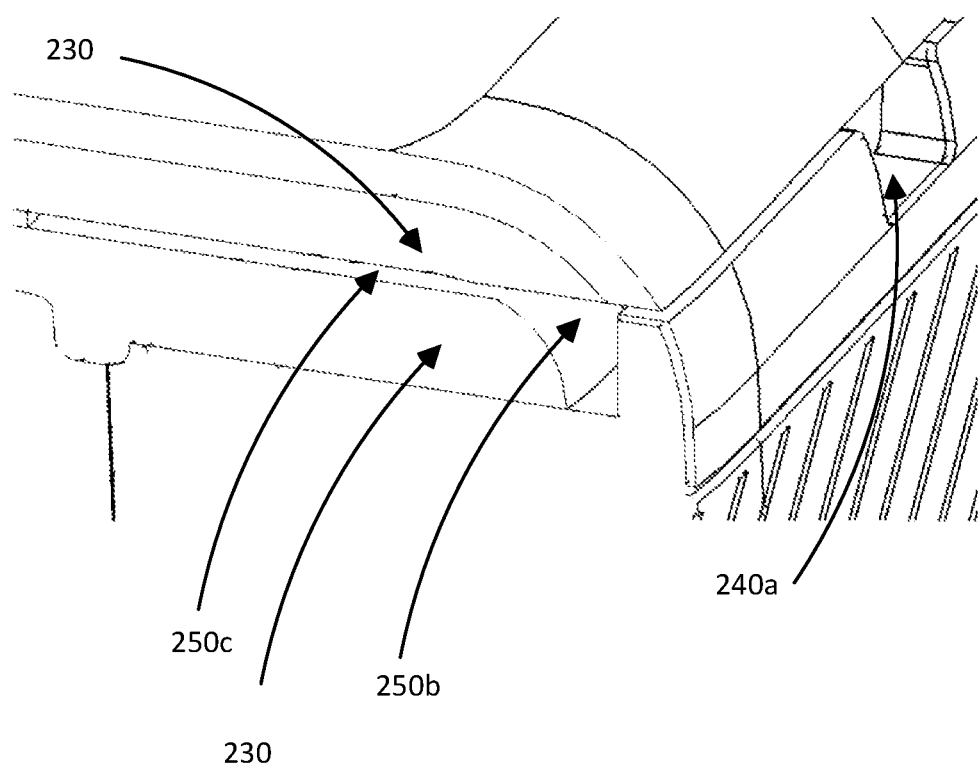
FIG. 3C is a third cross-sectional view of the drainage channel of a submersible camera system, according to one embodiment.

FIGS. 3A-3C illustrate several cross-sectional views of the drainage channels 250 in the camera system 100. FIGS. 3A and 3B show and embodiment of the first drainage channel 250a coupling the internal microphone port 220 to the first drainage port 240a via a recessed area in the front surface 230 of the camera. The microphone port 220 is coupled to the first drainage channel 250a. The first portion of the first drainage channel 250a is the area directly above the microphone port 220 (e.g. towards the top of the page in the orientation of FIG. 3B). The second portion of the first drainage channel 250a is distal to the first portion and couples the first drainage port 240a to the second portion. The first drainage channel 250a couples the microphone port 220 to the first drainage port 240a. In the illustrated embodiment, the first drainage port 240a is a gap between the back side of the front housing and the front surface of the camera body formed by a recession in the front surface.

FIG. 3C shows an embodiment of the second and third drainage channels 250b and 250c. The second drainage channel 250b may be the cavity near the left surface (e.g. the right side in the orientation of FIG. 3C) and bottom surface (not shown) of the camera body 102 coupling the first drainage port 240a to the second drainage port (not shown). The second drainage channel 250b is recessed from the front surface 230 of the camera body 102 proximal and adjacent to the perimeter of the camera body from the first drainage port 240a to the second drainage port (not shown).

The third drainage channel can be the cavity where there is no interface between the front surface 230 of the camera body and the back side of the front housing 210. In the illustrated embodiment, the third drainage channel is between the bottom side of the first drainage channel (not shown), the right side of the adhesive 260, the right side of the second drainage channel (e.g. to the left in the orientation of FIG. 3C), and the top side of the second drainage channel (not shown).

Drainage

Figure 4A:
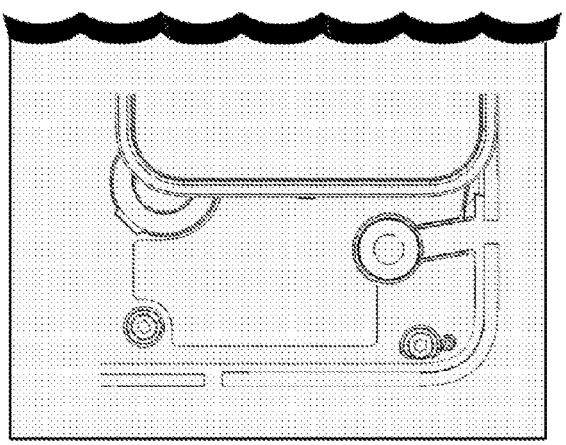
FIGS. 4A-4E are various planar views of the drainage channel illustrating liquid being cleared from the microphone on the front face of a submersible camera system, according to one embodiment.
Figure 4B:
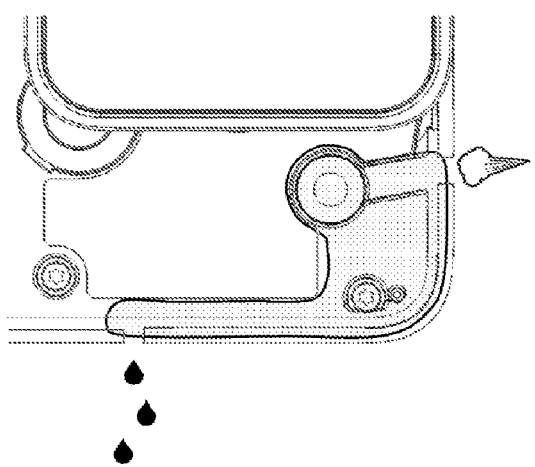
Figure 4C:
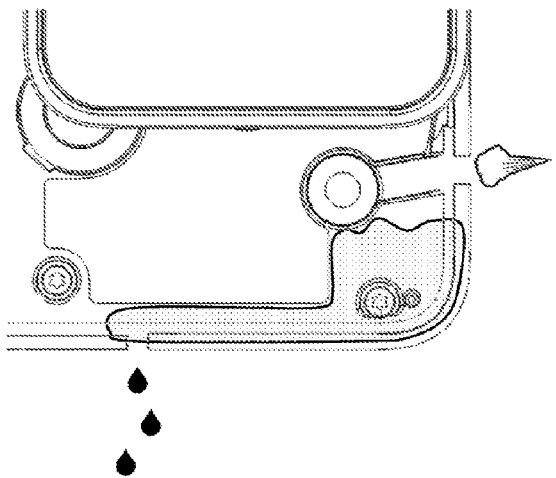
Figure 4D:
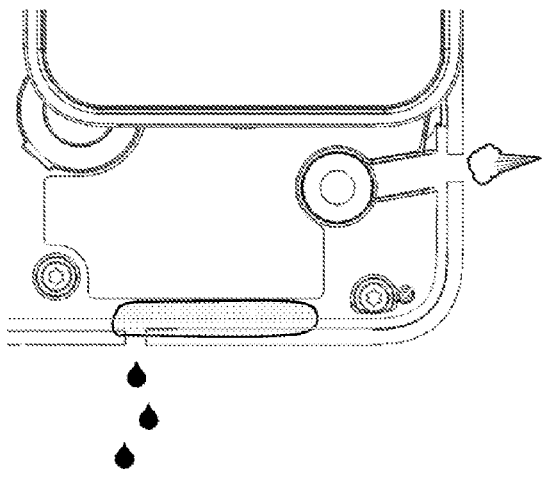
Figure 4E:
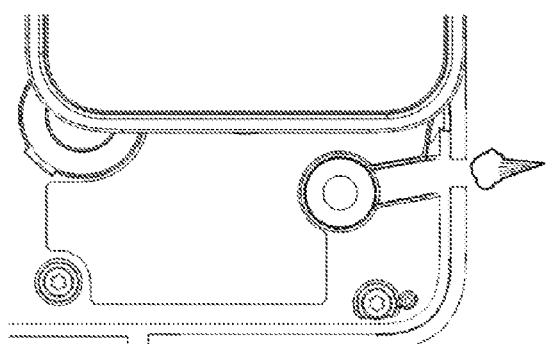

FIGS. 4A-4E illustrate the process of water draining from the microphone port 220 when the camera 100 is removed from a wet environment. FIG. 4A illustrates the camera 200 submerged in water and shows the drainage channels 250 filled with water. In FIG. 4B, the camera 200 emerges from the water and water in the channels 250 between the front surface of the camera body and the back side of the front housing begins to flow out through the first drainage port and the second drainage port and the second drainage port 240b via gravity. As shown in FIG. 4C, after the initial draining, water will no longer exit through the first drainage port and the first drainage port acts as an inlet for initial air to accelerate the draining process. FIG. 4D illustrates the water clearing from the drainage channels 250, the drainage ports 240, and/or the microphone 230 as air continues to enter the first drainage port 240a and water continues to exit the second drainage port 240b. In FIG. 4E the drainage port and channels are cleared, thus allowing the microphone to resume normal acoustic performance.

In the illustrated embodiment of FIG. 4A-4E, the first drainage channel clears moisture first, followed by the second drainage channel, followed by the third drainage channel. In various embodiments, this process can occur in any order depending on the orientation of the camera and the environment that the camera is in.

Alternate Embodiments

While the described embodiments define the orientations of surfaces for the microphone system, the drainage ports, the drainage channels, and the front housing, it is obvious to one knowledgeable in the art that these surfaces are arbitrarily defined and can be any surface of the camera so long as the connective drainage channels and drainage ports are appropriately configured to connect components of the camera as described.

While the described embodiments dictate moisture draining from the second drainage port, it is obvious to one knowledgeable in the art that this direction is arbitrarily defined in the specification, i.e. drainage can occur at any orientation of the camera to either the first or the second drainage port.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera system comprising:
a camera body comprising a bottom face, left face, right face, back face, top face, and front face, the front face of the camera body covered by a front housing;
an image sensor assembly coupled to a lens assembly to detect and capture images from sources external to the camera body;
an internal audio assembly recessed below the front face of the camera body comprising:
a microphone configured to capture audio signals from sources external to the camera body; and
a waterproof membrane configured to prevent moisture from passing from external the camera body to the microphone;
a plurality of drainage ports configured to drain moisture from the camera system at least including:
a first drainage port comprising an opening on the left face of the camera body; and
a second drainage port comprising an opening on the bottom face of the camera body;
a plurality of drainage channels recessed below the plane of the front face at least including:
a first drainage channel coupling the audio assembly to the first drainage port; and
a second drainage channel coupling the first drainage port to the second drainage port, the second drainage channel proximal to an edge of the camera body adjacent to the left face and the bottom face; and
wherein the front housing is coupled to the front face of the camera body, the front housing structured such that a third drainage channel exists between the front face and the front housing, the third drainage channel coupling the first and the second drainage channels to drain additional moisture from the camera system.

2. The camera system of claim 1, wherein the plurality of drainage ports each comprise indentations in the camera body that allows propagation of sound waves from external to the camera body to the drainage channels.

3. The camera system of claim 1, wherein the plurality of drainage ports each comprise a gap formed between the camera body and the front housing.

4. The camera system of claim 1, wherein the front housing is coupled to the front face of the camera body with an adhesive.

5. The camera system of claim 4, wherein there is an absence of adhesive localized to a first area of the front face, such that the third drainage channel is above the first area.

6. The camera system of claim 5, wherein the first area is coated with a hydrophobic element.

7. The camera system of claim 6, wherein an inner surface of the front housing is coated with a hydrophobic element.

8. A camera system comprising:
a camera body comprising at least a front face with a left side and a bottom side covered by a front housing;
an internal audio assembly recessed below the front face of the camera body comprising:
a microphone configured to capture audio signals from sources external to the camera body; and
a waterproof membrane configured to prevent moisture from passing from external the camera body to the microphone;
a plurality of drainage ports configured to drain moisture from the camera system at least including:
a first drainage port comprising an opening on the left side of the front face of the camera body; and
a second drainage port comprising an opening on the bottom side of the front face of the camera body;
a plurality of drainage channels recessed below the plane of the front face at least including:
a first drainage channel coupling the audio assembly to the first drainage port; and
a second drainage channel coupling the first drainage port to the second drainage port, the second drainage channel proximal to an edge of the camera body adjacent to the bottom side and the left side of the front face; and
wherein the front housing is coupled to the front face of the camera body, the front housing structured such that a third drainage channel exists between the front face and the front housing, the third drainage channel coupling the first and the second drainage channels to drain additional moisture from the camera system.

9. The camera system of claim 8, wherein the plurality of drainage ports each comprise indentations in the camera body that allows propagation of sound waves from external to the camera body to the drainage channels.

10. The camera system of claim 8, wherein the plurality of drainage ports each comprise a gap formed between the camera body and the front housing.

11. The camera system of claim 8, wherein the front housing is coupled to the front face of the camera body with an adhesive.

12. The camera system of claim 11, wherein there is an absence of adhesive localized to a first area of the front face, such that the third drainage channel is above the first area.

13. The camera system of claim 12, wherein the first area is coated with a hydrophobic element.

14. The camera system of claim 12, wherein an inner surface of the front housing is coated with a hydrophobic element.

15. A camera system comprising:
a camera body comprising a plurality of faces with at least one face covered by a front housing;
an internal audio assembly recessed below a first face of the camera body;
a plurality of drainage ports configured to drain moisture from the camera system at least including:
a first drainage port comprising an opening on a second face of the camera body; and
a second drainage port comprising an opening on a third face of the camera body;
a plurality of drainage channels:
a first drainage channel coupling the audio assembly to the first drainage port; and
a second drainage channel coupling the first drainage port to the second drainage port; and
wherein the front housing is coupled to the first face of the camera body, the front housing structured such that a third drainage channel exists between the first face and the front housing.

16. The camera system of claim 15, wherein the plurality of drainage ports each comprise indentations in the camera body that allows propagation of sound waves from external to the camera body to the drainage channels.

17. The camera system of claim 15, wherein the plurality of drainage ports each comprise a gap formed between the camera body and the front housing.

18. The camera system of claim 15, wherein the front housing is coupled to the front face of the camera body with an adhesive.

19. The camera system of claim 18, wherein there is an absence of adhesive localized to a first area of the front face, such that the third drainage channel is above the first area.

20. The camera system of claim 19, wherein the first area is coated with a hydrophobic element.

* * * * *